United States Patent

[11] 3,611,038

| | | | |
|---|---|---|---|
| [72] | Inventor | Ralph E. Benham | |
| | | Arcadia, Calif. | |
| [21] | Appl. No. | 855,975 | |
| [22] | Filed | Sept. 8, 1969 | |
| [45] | Patented | Oct. 5, 1971 | |
| [73] | Assignee | Purex Corporation, Ltd. | |
| | | Lakewood, Calif. | |

[54] GROUND FAULT AND HIGH CURRENT RESPONSIVE CIRCUIT BREAKER UTILIZING AMPLIFIED SIGNALS
5 Claims, 2 Drawing Figs.

[52] U.S. Cl............................................ 317/18 D,
317/33 SC, 317/27 R, 317/54
[51] Int. Cl............................................ H02h 3/10
[50] Field of Search............................ 317/18, 33,
36, 27, 51, 54; 324/51

[56] References Cited
UNITED STATES PATENTS

| | | | | |
|---|---|---|---|---|
| 3,019,373 | 1/1962 | Kramer | | 317/27 X |
| 3,213,321 | 10/1965 | Dalziel | | 317/33 X |
| 3,286,129 | 11/1966 | Gagniere | | 317/27 X |
| 3,467,890 | 9/1969 | Mayer | | 317/33 |

*Primary Examiner*—J. D. Miller
*Assistant Examiner*—Harry E. Moose, Jr.
*Attorney*—White, Haefliger & Bachand ABSTRACT: This invention relates to protective circuit means wherein a differential transformer and a current transformer are interposed between the AC line and a load device connected thereto, the transformers being adapted to respond, respectively, to leakage conditions and to overload conditions in the load devices. The protective circuit includes separate sensing amplifiers respectively responsive to the leakage or overload conditions, whichever occurs at any time, to produce a fault signal, and a trip signal generator responsive to the fault signal and to open circuit breaker contacts in the AC line and so remove power from the load device in the presence of the undesirable leakage and overload conditions until they have passed. A feature of the novel circuit is a simple test circuit simulating the fault conditions.

INVENTOR
RALPH E. BENHAM
BY
ATTORNEY

GROUND FAULT AND HIGH CURRENT RESPONSIVE CIRCUIT BREAKER UTILIZING AMPLIFIED SIGNALS

BACKGROUND OF THE INVENTION

In my prior applications, Ser. No. 478,182, filed Aug. 9, 1965 entitled Leak Detector for Swimming Pool Lights and the Like, and in continuation-in-part application Ser. No. 594,572 filed Nov. 15, 1966, which have matured into U.S. Pat. No. 3,407,337, I have described and claim leak-detecting circuits for faults such as moisture leakage for swimming pool lighting fixtures and the like.

In these applications, a differential transformer connected in phase opposition normally generates no signal in a sense winding. Any leakage unbalances the transformer to generate a signal in the sense winding which is rectified to drive a relay circuit to interrupt the line power to the lamp circuit. In application Ser. No. 594,572, improvements in circuit configuration were described over the circuits shown in Ser. No. 478,182 to permit more efficient operation, and showing other control means incorporating in one embodiment silicon controlled rectifier devices in place of relays to perform the interrupting function.

PRIOR ART

In other prior art devices, differential transformers for operating trip circuits are shown, as exemplified by Dalziel U.S. Pat. No. 3,213,321. In the Bateman U.S. Pat. No. 3,202,875, a product-signal-responsive directional relay serves to open the circuit in the event of a fault. The Moser U.S. Pat. No. 3,214,638 described means to open a safety switch when one of several parameters such as leakage current intensity, potential, or ohmic resistance exceeded a predetermined value. The Blackburn U.S. Pat. No. 3,243,658 senses an under-or-over voltage condition to regulate the voltage output by interrupting the circuit in the presence of such under-or-over voltage.

THE PRESENT INVENTION

This invention differs from the prior art in particular in that a differential transformer is used to detect leakage or ground short or similar faults via a differential transformer interposed between the power source and load. A current transformer in series with one leg of the AC line to the load provides means to detect an excess current (overload) condition not necessarily amounting to but which may include a short circuit.

Each of the differential and current transformers has a respective sensing amplifier circuit employing integrated circuit modules providing an output signal representative of the respective fault condition detected. Either output signal is applied to a trip signal generator employing a unijunction transistor driven by an FET transistor to control the on-off operation of the generator in response to either of the fault condition output signals.

The output of the current amplifier is applied through a time delay or integrating circuit so that a simple surge of current magnitude will not trip the unit off, but it would take a continuing overload to trip it off. For instance, a motor or a incandescent lamp load will draw much more than its rated load during startup, but will within a few seconds settle down to the rated current. The circuit breaker must not trip out on this initial surge.

A gated circuit breaker employing an SCR triggered by the unijunction transistor operates the circuit interruptor contacts of a circuit breaker in the SCR circuit. These contacts are in series with the AC power line.

A test circuit is provided which applies either a direct AC line signal to the overload current sensor circuit to totally simulate an overcurrent condition or essentially places a leakage or short (of relatively low current) across the line to generate an unbalance in the differential transformer to produce simulated fault signals to the protective circuit operation.

The nature of the invention is more fully described in the specification which follows describing an exemplary embodiment of the invention as shown in the accompanying figures.

DESCRIPTION OF THE EXEMPLARY EMBODIMENTS

Figure 1:
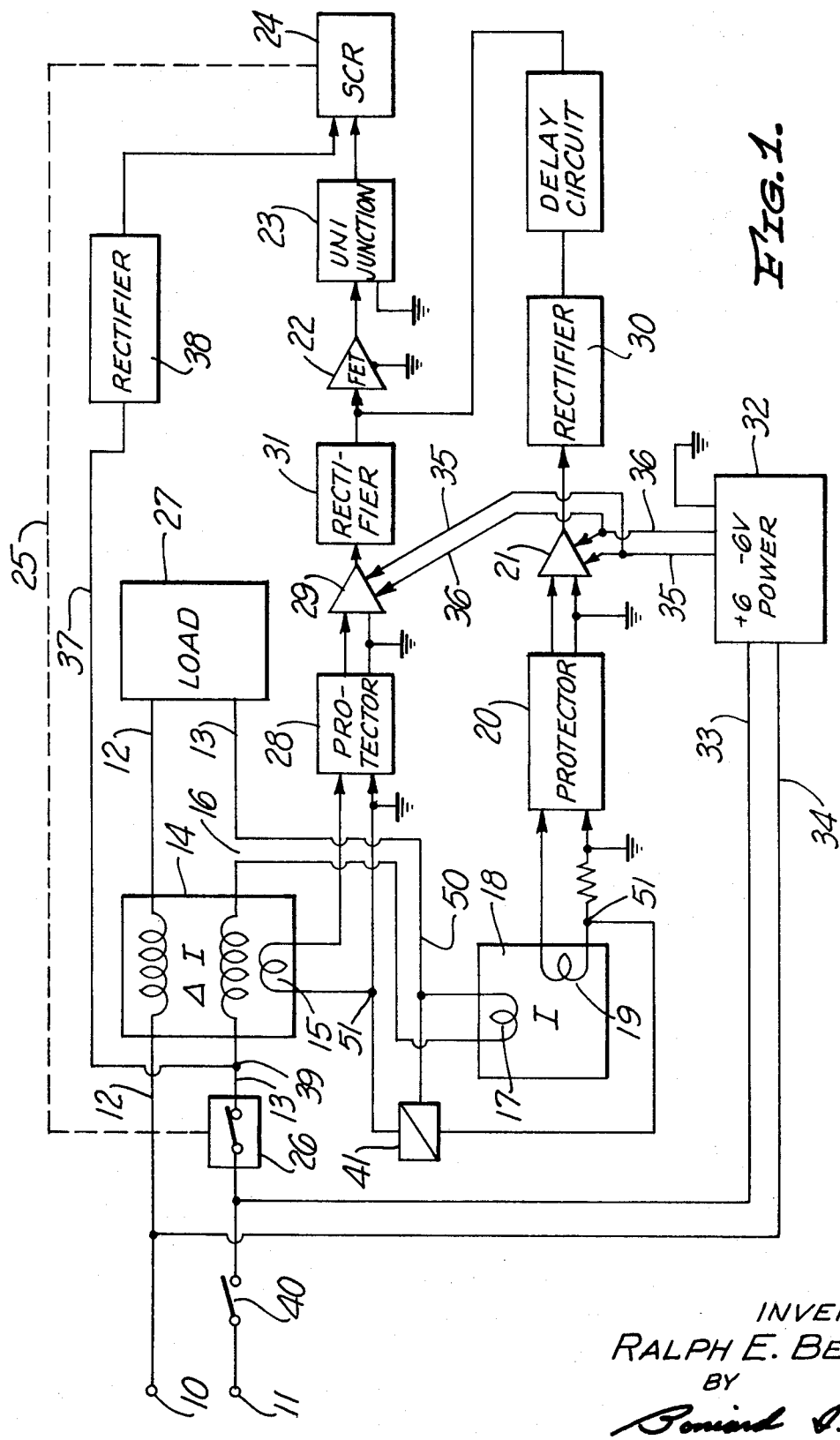
FIG. 1 is a block and circuit diagram of the protective circuit of this invention.

In FIG. 1 there is shown a block diagram of the improved protective circuit for electric power systems. The AC power source is applied at terminals 10, 11. The line 12 being the "common" and the line 13 being the "hot" line. Both lines 12 and 13 pass through a differential transformer 14 identified as the ΔI transformer because it responds to current differences or unbalance between the current phases in lines 12, 13 to produce an output in the tertiary winding 15 of the differential transformer 14.

Line 13 is broken at 16 for connection to a series current sensing winding 17 in a current transformer 18 identified as the I transformer. The secondary 19 of the I transformer 18 is connected to a protective circuit 20 which limits the input to the integrated circuit-sensing amplifier 21. In case of a direct short circuit to ground, the voltage generated by 15 would be quite high; so to keep the differential amplifier from being destroyed, the voltage limiters 28 limit the maximum drive amplitude to the amplifier 29. A rectifier 30 at the output of sense amplifier 21 supplies an FET amplifier 22 through a time delay or integrating circuit signal which in turn is applied to a unijunction trigger cion trigger circuit 23 which is connected to a silicon controlled rectifier SCR circuit 24, operating a circuit breaker trip coil which is mechanically (line 25) controlling the contacts of the circuit breaker 26 in series with hot power line 13. A load or utilization circuit 27 is connected to power lines 12, 13 at a point beyond break 16 so that any current drawn by load 27 may be sensed by winding 17.

Winding 15 of ΔI transformer 14 is connected to voltage limiter 28 which in turn is connected to another integrated circuit-sensing amplifier 29. The output of sense amplifier 29 is connected through a rectifier 31 to the FET amplifier 22, previously mentioned at the same point at which the output of rectifier 30 is connected. The operation is performed without delay, since in the event of a differential current due to fault, the circuit is to be opened immediately.

A regulated power supply 32 steps down and rectifies the AC power applied at 33, 34 to provide a +6 v. and −6 v. output on lines 35, 36 applied to both integrated circuit sense amplifiers 21 and 29.

Another power supply 38 connected by line 37 between the AC line at point 39 and SCR relay circuit 24 provides DC at powerline voltages for the SCR relay circuit 24.

A switch 40 in the "hot" side 11, 39, 13 of the AC power line is a master on-off switch for the system and is normally for manual operation.

At 41 is shown a pair of test switch circuits manually operable to produce a simulated phase difference for a ΔI error or overload condition, and for an I excess condition respectively. The switching is accomplished between the output lead 50 of winding 17 and a grounded point 51 on winding 15 or an ungrounded one on winding 19.

Figure 2:
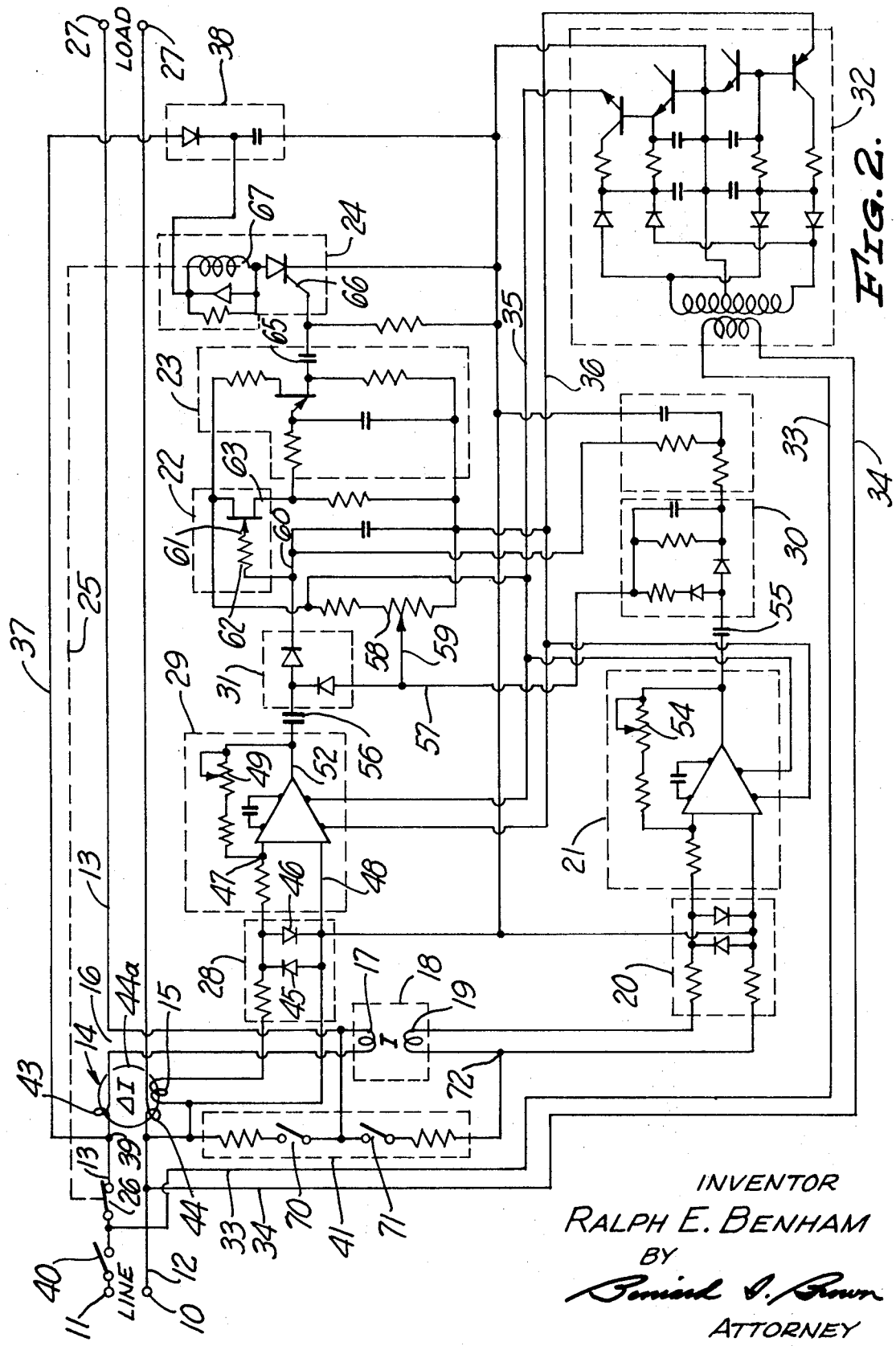
FIG. 2 is a schematic circuit diagram of the invention detailing circuits shown in the block of FIG. 1.

In FIG. 2 a complete schematic circuit diagram of the protective circuit of this invention is shown. Each of the blocks set forth in FIG. 1 has been enclosed in dashed lines in FIG. 2 to identify the circuit detail in the respective blocks. The dashed outlines in FIG. 2 bear numbers corresponding to those blocks in FIG. 1 to which they relate.

In the ΔI block 14, the AC line windings 43, 44 have been identified as having each of four turns. This may vary as to number of turns; but in every case, the turns for each winding are identical in number and oriented so as to produce opposite phase polarities in the core 44 on which they are wound, thus providing no coupling to tertiary winding 15 so long as the currents in each of lines 12 and 13 are equal.

An unbalance is created when there is a change of current in any one lead (12, 13) due to leakage or overload. This unbalance results in the coupling of a current to winding 15 producing an AC signal therein which, when applied across oppositely poled diodes 45, 56, applies pulses to the input 47, 48 of integrated circuit 29. The normal signal level, including trip level is less than the breakover level of diodes; therefore, the signal is squared only on excessively high-level signals (much higher than trip levels), and is used simply as protective means. Control 49 is adjusted to set the level of the output of circuit 29 at which an output signal will be delivered at output 52 to diode rectifier circuit 31.

Similarly, the winding 19 of current transformer 18 will have a current induced therein at all times, but the amplitude thereof for normal operation will produce pulses form rectifier 20 at the input to sense amplifier 21 of such a value that no tripping action (as further explained below) can be obtained at unijunction transistor 23 to operate SCR relay 24. The setting of the control determines the output of integrated circuit sense amplifier 21.

Sense amplifier 21 and sense amplifier 29 are very similar in their operation. The output of amplifier 21 is applied across capacitor 55 to diode network 30. The output of sense amplifier 29 is applied across capacitor 56 to diode network 31. Note that diode networks 30 and 31 have a common connection 57 to the arm 59 of a potentiometer 58 across power supply output leads 35, 36 for the +6- and −6 -volt supply so that there is a balancing bias, with respect to ground to set the level above which the diode networks 30 or 31 will conduct the outputs from sense amplifiers 21, 29 to apply respectively to the gate electrode 61 of FET amplifier 22 at point 60. A high resistance value resistor 62 limits the gate current applied to gate 61.

The unijunction transistor 23 is connected as a signal generator under the control of the source of electrode 63 of FET amplifier 22. The presence of a signal of appropriate amplitude set by controls 49 or 54 from sense amplifiers 29 or 21 respectively will result in the tripping of unijunction transistor 23 to produce a signal across capacitor 65 upon gate electrode 66 of SCR relay 24 to fire the SCR rendering it conductive to energize the coil 67 of the circuit breaker to actuate switch contacts 26 (normally closed) to their open condition, removing the AC power from leads 12, 13 and from the load 27.

The test circuit 41 consists of a pair of switches 70, 71 which are normally open. Switch 70, when closed, permits the application of a leakage current through a relatively large resistor (15K ohms) between the output side of winding 17 and ground or AC common to simulate a differential current increase through winding 43 and 44 to thereby trip the SCR relay circuit 24 as above described through the unbalance of transformer 14.

When switch 71 is closed, an AC signal derived from the powerline and comparable to the signal developed in a winding 19 as a result of a current overload in winding 17, will be applied to point 72 in the output winding 19. This will cause the SCR relay 24 to trip as above described.

In either case, switch 70 or 71 is used to produce a simulated condition for testing the overload ro leakage operation of the protective circuit.

There has been described hereinabove a circuit protective system for AC circuits which is responsive to either a leakage or short condition or an increase in current beyond a preset level to interrupt or open the AC powerline circuit to a load device therein, thus preventing either damage to equipment providing the AC power or to the load equipment.

In the description, a representative embodiment has been described. This should not be construed as limiting the invention to the one embodiment, since those skilled in the art pertaining to the invention will be able to conceive other embodiments or variations in the light of the teachings herein within the ambit of the claims which follow.

I claim:

1. A protective circuit for AC powerlines and load equipment connected thereto, said circuit comprising:

a differential transformer having the lines of the AC powerline connected therethrough equally and in opposing phase polarity to form primary and secondary windings normally having current cancellation properties, and having a third winding therein to sense the presence of any inequality in the currents in said primary and secondary windings and adapted to develop an output voltage in the presence of such inequality;

a first-pulse circuit connected to said third winding and having an output at which pulses are present which correspond to the output from said third winding;

a first circuit sense amplifier connected to said first pulse circuit, said first sense amplifier having an output circuit in which said pulses appear;

a first rectifier circuit coupled via a capacitor to the output of said first sense amplifier;

a current transformer having a primary winding connected in series with one of said AC powerlines and a secondary winding adapted to produce an output current related to the current in said current transformer primary winding;

a second pulse circuit connected to said secondary winding of said current transformer and having an output at which pulses are present which correspond to the output from said current transformer secondary winding;

a second circuit sense amplifier connected to said second pulse circuit, said second sense amplifier having an output circuit in which said second pulses appear;

a second rectifier circuit coupled via a capacitor to the output of said second sense amplifier;

an FET amplifier connected to both said first and said second rectifier circuit, said FET amplifier having an output circuit and being responsive to whichever of said rectifier circuits is producing a signal, derived from respective first and second pulses applied thereto, to produce a control signal;

a unijunction transistor, having an input circuit coupled to the output of said FET amplifier and being responsive to the control signal therein to produce a trigger signal when said control signal is present; and a normally conductive SCR relay circuit having a gate circuit coupled to said unijunction transistor and being responsive to said trigger signal to become conductive, said relay circuit having a relay therein and normally closed contacts on said relay connected in series between said AC powerline and said load equipment, whereby whenever either an unbalanced condition in said differential transformer or an excess current condition occurs in said current transformer said SCR relay circuit will be actuated to disconnect an AC powerline from said load equipment.

2. In the protective circuit defined in claim 1, a test circuit connected between said current transformer primary and a point of reference potential and including a pair of normally open switches for manually connecting said test circuit to said protective circuit to simulate either a leakage or overload condition to check the operation of the protective circuit.

3. In the protective circuit defined in claim 1, a regulated power supply having positive and negative voltage outputs connected to said first and second integrated circuit sense amplifiers and having an output potentiometer control across the output of said power supply, said potentiometer having an arm connected in common to said first and second rectifier circuits to provide an adjustable bias level to said rectifier circuits for setting the conductive operational level thereof.

4. A protective circuit for AC powerlines and load equipment connected thereto, said circuit comprising:

a differential transformer, the AC powerlines being wound thereon in phase opposition as balanced primary and secondary windings, and having a tertiary winding adapted to develop a voltage signal indicative of the condition of unbalance in the AC current through said primary and secondary windings;

a current transformer having a primary winding in series with one of said AC powerlines following said differential transformer and a secondary winding adapted to develop a current indicative of the current in said primary of said current transformer;

a first-sensing circuit connected to said tertiary winding; a second-sensing circuit connected to said secondary winding of said current transformer, said first- and second-sensing circuits each including amplifier means;

a normally inoperative control signal generator;

an enabling amplifier connected to said control signal generator and to both said sensing circuits and adapted to be responsive to whichever of said sensing circuits is receiving current from said differential transformer or said current transformer to develop an enabling signal applied to said control signal generator so that said generator is rendered operative; and a circuit-interrupting means connected in said AC powerline and coupled to said sensing circuits, said interrupting being responsive to said control signal to interrupt the AC line connection to the load equipment in the presence of said leakage or said excess current conditions.

5. In the protective circuit defined in claim 4, a test circuit connected across the AC line at the output connection of the primary of said current transformer to the load equipment connected thereto, and from said output connection to said secondary winding of said current transformer at the connection thereof to said second-sensing circuit, said test circuit including respective normally open switches between said output connection and the respective current transformer connections thereof, said switches being respectively manually operative to apply a simulated overload or unbalance signal condition to energize said relay thereby to test the operation of said protective circuit.